US008690118B2

(12) United States Patent
Bunni et al.

(10) Patent No.: US 8,690,118 B2
(45) Date of Patent: Apr. 8, 2014

(54) SOLENOID ACTUATED DEVICE AND METHODS

(75) Inventors: Nadeem N. Bunni, Cranberry, PA (US); Jayaraman K. Venkataraghavan, Dunlap, IL (US); Stephen R. Lewis, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 1127 days.

(21) Appl. No.: 12/684,379

(22) Filed: Jan. 8, 2010

(65) Prior Publication Data

US 2011/0168813 A1 Jul. 14, 2011

(51) Int. Cl.
*F16K 31/02* (2006.01)

(52) U.S. Cl.
USPC ................. 251/129.16; 239/585.3; 239/585.5

(58) Field of Classification Search
USPC ........... 251/129.15, 129.16; 239/585.1–585.5
See application file for complete search history.

(56) References Cited

U.S. PATENT DOCUMENTS

| | | | | |
|---|---|---|---|---|
| 3,755,766 | A | 8/1973 | Read, Jr. | |
| 5,407,174 | A | 4/1995 | Kumar | |
| 6,279,843 | B1 * | 8/2001 | Coldren et al. | 239/585.1 |
| 6,489,870 | B1 | 12/2002 | Ward et al. | |
| 6,601,822 | B2 | 8/2003 | Tachibana et al. | |
| 6,959,732 | B2 | 11/2005 | Cotton, III et al. | |
| 8,083,206 | B2 * | 12/2011 | Manubolu et al. | 251/129.16 |
| 8,113,177 | B2 * | 2/2012 | Hayatani et al. | 123/467 |
| 2006/0138249 | A1 | 6/2006 | Shinogle | |
| 2007/0138422 | A1 * | 6/2007 | Najmolhoda et al. | 251/129.14 |
| 2012/0153034 | A1 * | 6/2012 | Venkataraghavan et al. | 239/5 |

OTHER PUBLICATIONS

Self-Guided Armature in Single Pole Solenoid Actuator Assembly and Fuel Injector Using Same; U.S. Appl. No. 12/321,809, filed Jan. 26, 2009.

* cited by examiner

*Primary Examiner* — John K Fristoe, Jr.
*Assistant Examiner* — Ian Paquette
(74) *Attorney, Agent, or Firm* — Liell & McNeil

(57) ABSTRACT

A solenoid actuated device such as a fuel injector includes an actuator body having a plurality of body pieces, and a single-pole solenoid actuator assembly positioned at least partially within the actuator body. The single-pole solenoid actuator assembly includes a one-piece compound armature housing having a load carrying component clamped between the first body piece and the second body piece, and a flux carrying component. The load carrying component includes a high structural strength and a low flux permeability, and the flux carrying component includes a low structural strength and a high flux permeability. A method of making a solenoid actuated device includes placing an armature at a sliding radial air gap with a flux carrying component of a one-piece compound armature housing, and establishing a structural load path by placing a load carrying component of the compound armature housing between a first actuator body piece and a second actuator body piece. A method of operating a single-pole solenoid actuator device includes supporting a flux carrying component of a one-piece compound armature housing with a load carrying component of the compound armature housing, channeling magnetic flux across a sliding air gap between a flux carrying component and the armature, and channeling a clamping load between a first actuator body piece and a second actuator body piece through the load carrying component of the compound armature housing.

14 Claims, 3 Drawing Sheets

SOLENOID ACTUATED DEVICE AND METHODS

TECHNICAL FIELD

The present disclosure relates generally to solenoid actuators, and relates more particularly to channeling a magnetic flux and a structural load through a compound armature housing in a single-pole solenoid actuator assembly.

BACKGROUND

A wide variety of solenoid actuators and solenoid actuated devices are known in the electromechanical arts. Solenoid actuators may be broadly classified as having dual-pole or single-pole solenoids. In most dual-pole solenoid designs, an armature is spaced at an axial air gap with a stator having a coil embedded therein. Dual-pole solenoids are often identified by an armature diameter that is about the same or greater than an outer diameter of the coil winding of the stator. When the coil in a dual-pole solenoid is energized, magnetic flux is generated around the coil, and flux lines pass through the stator, to the armature and back to the stator. The resulting flux path produces a pair of magnetic north and magnetic south poles between the stator and armature on each side of the axial air gap. The flux between these poles is generally parallel to the armature motion. These opposite poles produce a force on the armature that tends to move it toward the stator and coil to accomplish some task, such as opening or closing a valve.

In a typical single-pole solenoid, the magnetic flux path also encircles the coil and passes through the stator, the armature and back to the stator. The resulting flux path also produces a pair of magnetic north and south poles between the stator and the armature. In contrast to dual-pole configurations, the flux path between the poles is parallel to armature motion for one set of poles, and perpendicular to armature motion for the other set of poles. The perpendicular portion of the flux path may traverse a sliding radial air gap between the armature and another electromagnetic component that is present to complete the magnetic circuitry. Single-pole solenoids are often identified by an armature diameter that is smaller than the inner diameter of the coil winding of the stator. Due at least in part to manufacturing considerations, the additional electromagnetic component that is present in single-pole solenoids is often not a part of the stator itself. Rather, it is generally in contact with or positioned very close to the stator. The extra electromagnetic component is also typically stationary, hence the description of the air gap between this extra component and the armature as a "sliding radial air gap." Single-pole solenoids remain preferred in certain applications.

The extra electromagnetic component mentioned above is often referred to as a magnetic flux ring. It is common to use materials such as iron and silicon iron to form the flux ring component. While such flux rings have worked well in certain designs, they are often associated with leakage of magnetic flux out of the desired flux path. In addition, because such flux rings are typically made of materials that are not only magnetically conductive, but also electrically conductive, eddy currents can form within the flux ring. The eddy currents create magnetic fields resisting the pull-in force on the associated armature when the solenoid is energized. Certain designs have been proposed to address these issues. Among them is the proposal to form slots in the flux ring to create longer path lengths for eddy currents to travel. As a result, the magnetic fields generated by the eddy currents may be relatively weaker. While these strategies have seen some success, there remains room for improvement.

SUMMARY OF THE INVENTION

In one aspect, a solenoid actuated device includes an actuator body including a first body piece having a first clamping surface, a second body piece having a second clamping surface, and a clamping mechanism which includes a release state and a clamping state. The solenoid actuated device further include a single-pole solenoid actuator assembly positioned at least partially within the actuator body and including a stator, an armature movable relative to the stator, and a movable member coupled with the armature. The single-pole solenoid actuator assembly further includes a-one-piece compound armature housing having a load carrying component clamped between the first clamping surface and the second clamping surface, and a flux carrying component supported by the load carrying component and defining a sliding air gap with the armature. The load carrying component includes a high structural strength and a low flux permeability, and the flux carrying component includes a low structural strength and a high flux permeability.

In another aspect, a method of making a solenoid actuated device includes establishing a magnetic flux path for a single-pole solenoid actuator at least in part via placing an armature at an axial air gap with a stator, and placing the armature at a sliding radial air gap with a flux carrying component of a one-piece compound armature housing. The method further includes establishing a structural load path for the single-pole solenoid actuator at least in part via placing a load carrying component of the one-piece compound armature housing between a first actuator body piece and a second actuator body piece. The method further includes clamping the one-piece compound armature housing between the first actuator body piece and the second actuator body piece.

In still another aspect, a method of operating a single-pole solenoid actuated device includes supporting a stator, an armature and a one-piece compound armature housing of a single-pole solenoid actuated device, within an actuator body. The method further includes supporting a flux carrying component of the one-piece compound armature housing with a load carrying component of the one-piece compound armature housing. The method further includes channeling magnetic flux across a sliding air gap between the flux carrying component and the armature, and channeling a clamping load between a first actuator body piece and a second actuator body piece through the load carrying component of the one-piece compound armature housing.

DETAILED DESCRIPTION

Figure 1:
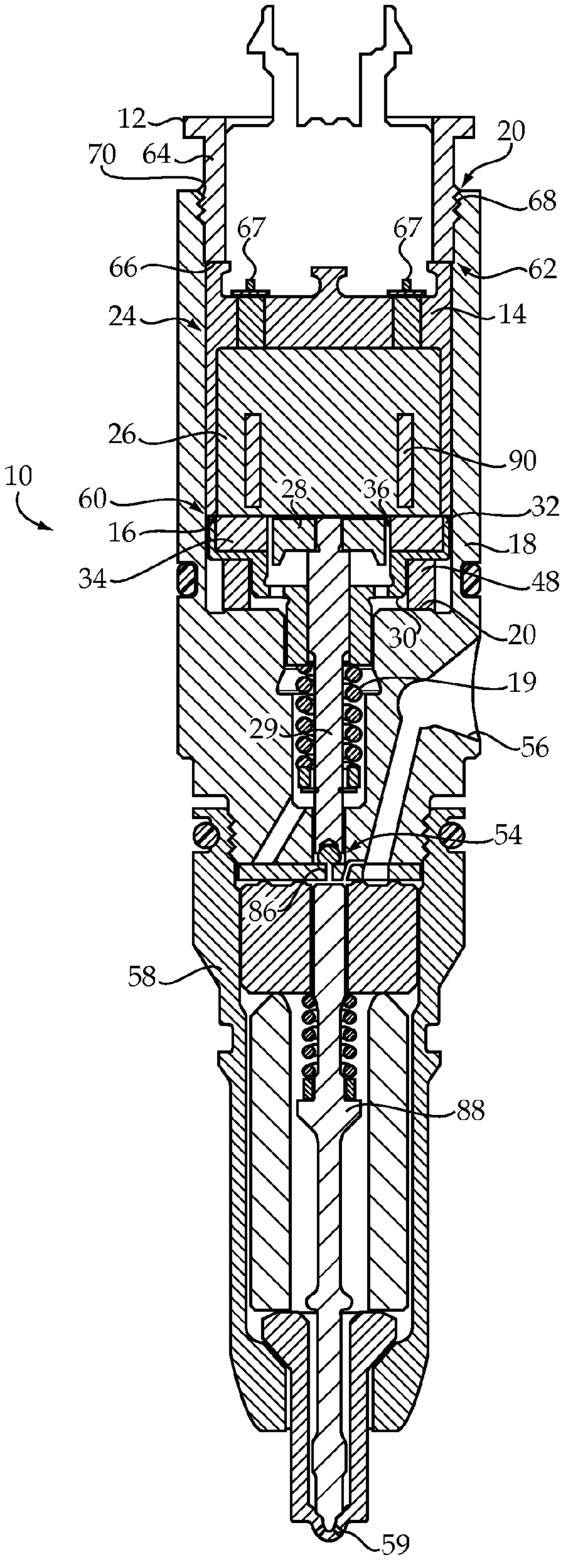
FIG. 1 is a sectioned side diagrammatic view of a solenoid actuated device, according to one embodiment.

Referring to FIG. 1, there is shown a solenoid actuated device 10 according to one embodiment. Device 10 may include a hydraulically actuated electronically controlled fuel injector, but many other solenoid actuated devices are contemplated to fall within the scope of the present disclosure. Device 10, hereinafter referred to as fuel injector 10, may include an actuator body 12 having a plurality of body pieces, including a first body piece 14 and a second body piece 18. A single-pole solenoid actuator assembly 24 may be positioned at least partially within actuator body 12 and includes a stator 26, an armature 28 movable relative to stator 26, and a movable member 29 coupled with armature 28. In one embodiment, movable member 29 may include a movable pin which includes a valve control pin movable between a first pin position and a second pin position. Fuel injector 10 may further include a control valve mechanism 54 positioned at least partially within second body piece 18 and being controllably coupled with movable member 29. Second body piece 18 may further define a fuel inlet 56 of a type suitable for fluidly connecting fuel injector 10 with a common rail of an internal combustion engine system, or with a unit pump or the like as known in the art.

Actuator body 12 may further include a third body piece 58 wherein an outlet check 88 of fuel injector 10 is positioned. Outlet check 88 may include a conventional needle check configured to move between a closed position and an open position to fluidly connect one or more nozzle outlets 59 with fuel inlet 56 in a known manner. Control valve mechanism 54 may include a check control valve member 86 such as a ball valve. Valve member 86 may be movable in response to moving movable member 29 via actuating single-pole solenoid actuator assembly 24, again in a known manner.

In one embodiment, first body piece 14 may include a stator housing, and second body piece 18 may include a valve body. Third body piece 58 may include a nozzle body having one or more nozzle body components which define nozzle outlet 59. As further described herein, selection of materials for certain of the components of fuel injector 10, as well as forming certain components with particular geometries, is contemplated to provide a fuel injector or other solenoid actuated device having robust magnetic and structural properties.

To this end, actuator assembly 24 may further include a one-piece compound armature housing 30 having a load carrying component 32 and a flux carrying component 34 supported by load carrying component 32 within actuator body 12. Flux carrying component 34 may define a sliding air gap 36 with armature 28. Load carrying component 32 and flux carrying component 34 may have different structural, magnetic and electrical properties. In one embodiment, load carrying component 32 may include a high structural strength and a low flux permeability, whereas flux carrying component 34 may have a low structural strength and a high flux permeability. Load carrying component 32 may also include a relatively low electrical resistivity, whereas flux carrying component 34 may have a relatively high electrical resistivity, the significance of which will be apparent from the following description. It should be appreciated that the various properties of the respective components such as flux permeability may vary based on part geometry and/or operating characteristics of the associated system. For instance, variance in factors such as electrical current or voltage used in energizing solenoid actuator assembly 24, or changes in part location, dimensions or shape, may result in changes in the observed flux permeability of flux carrying component 34 or load carrying component 32. Load carrying component 32 may be formed, for example, from a relatively hard, relatively non-magnetic material such as stainless steel. Flux carrying component 34 may be formed from a relatively soft, relatively highly magnetic material such as a powder material comprised of iron particles coated with a non-conducting material. Suitable materials for forming flux carrying component 34 are available, for example, under the trade name Somaloy®. As used herein, it should be understood that the terms "relatively non-magnetic" and "relatively highly magnetic" refer to electrically induced magnetism as opposed to permanent magnetism.

It has been discovered that certain materials, such as those used for flux carrying component 34 in a practical implementation strategy, tend to be poorly suited for carrying loads, at least when used in certain types of devices. Such materials tend to crumble if subjected to repeated impacts with other components of an associated system, and can structurally fail or deform if subjected to loads. As will be further apparent from the following description, the configuration of one-piece compound armature housing 30 addresses these and other concerns.

Figure 2:
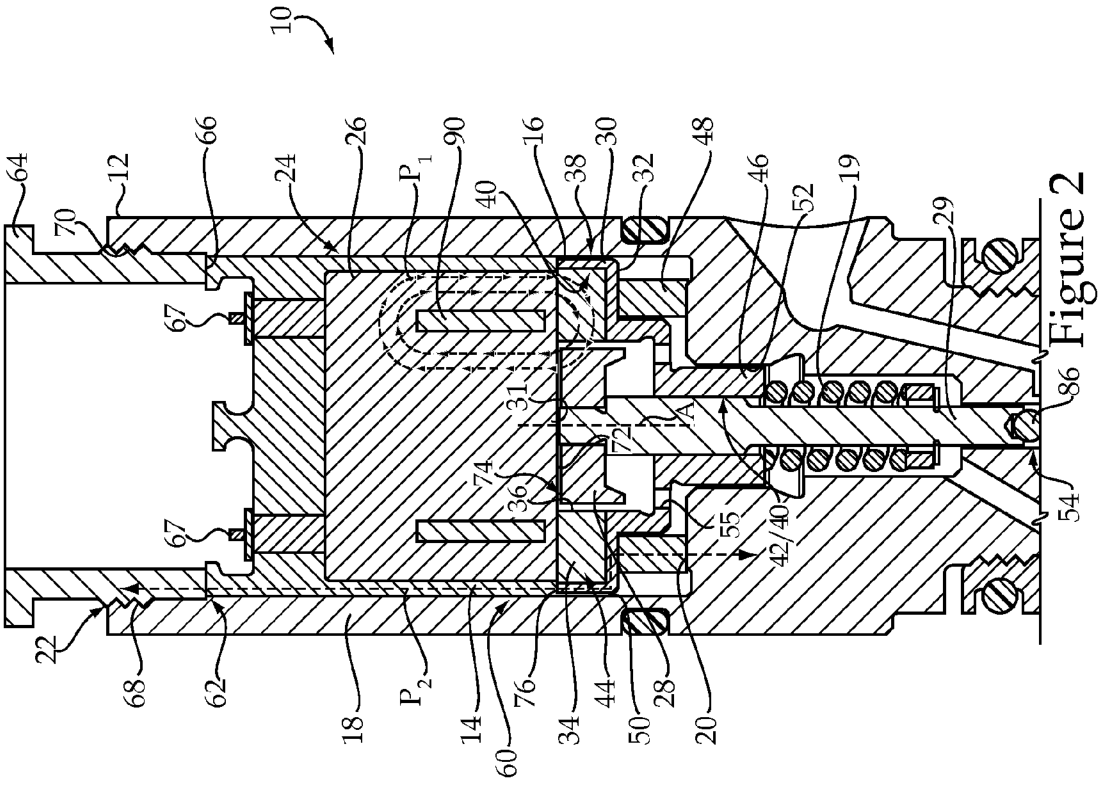
FIG. 2 is a sectioned side diagrammatic view of a portion of the device of FIG. 1.

Referring now also to FIG. 2, there is shown a portion of fuel injector 10 enlarged and in greater detail as compared with FIG. 1. As alluded to above, compound armature housing 30 may provide dual services of channeling magnetic flux during operating actuator assembly 24, and also channeling structural loads between and among components of fuel injector 10. First body piece 14 may have a first clamping surface 16, and second body piece 18 may have a second clamping surface 20. Fuel injector 10 may further include a clamping mechanism 22 having a release state and a clamping state, and being configured to clamp compound armature housing 30 between components of fuel injector 10. As mentioned above, first body piece 14 may include a stator housing positioned about a stator 26 and a solenoid 90 of actuator assembly 24. First body piece 14 may further include a first stator housing end 60 having first clamping surface 16 located thereon, and a second stator housing end 62. Load carrying component 32 may be clamped between first clamping surface 16 and second clamping surface 20, in contact with first clamping surface 16. In one embodiment, a spacer 48 may be positioned axially between compound armature housing 30 and second clamping surface 20, for reasons further described herein.

Actuator body 12 may further include a fuel injector cap 64 having a third clamping surface 66 contacting second stator housing end 62 such that first body component/stator housing 14 is clamped between fuel injector cap 64 and compound armature housing 30. In one embodiment, clamping mechanism 22 may include a first set of threads 68 which may be external threads located on fuel injector cap 64, and a second set of threads which may be internal threads 70 located on second body piece 18. In other embodiments, clamping mechanisms other than cooperating internal and external threads might be used. Moreover, rather than locating threads 68 and 70 on the body pieces shown in FIGS. 1 and 2, they might alternatively be located on other body pieces of fuel injector 10 or at locations other than those shown.

Figure 3:
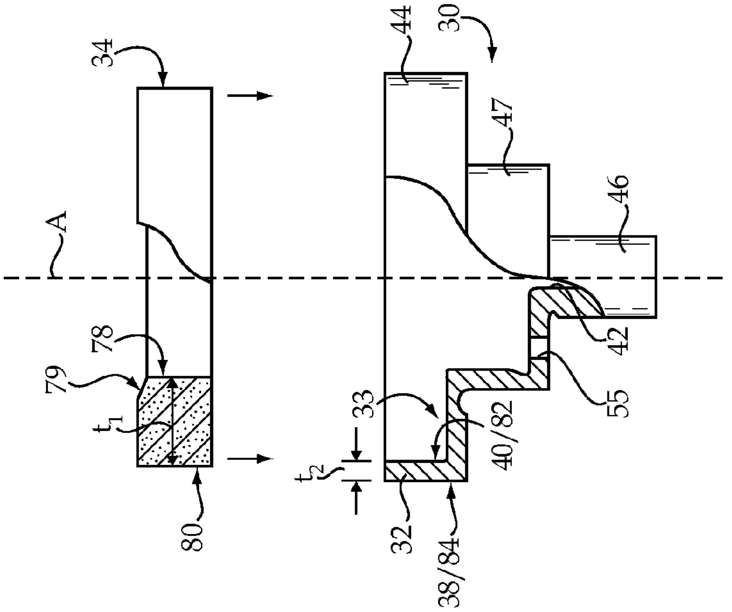
FIG. 3 is a disassembled view of a compound armature housing, according to one embodiment.

In one embodiment, compound armature housing 30 may be configured to serve further functions beyond those of a flux carrier and a structural load carrier. To this end, compound armature housing 30 may define a longitudinal axis A and include an outer radial surface 38 and an inner radial surface 40 defining a guide bore 42 for movable member 29. Referring also to FIG. 3, compound armature housing 30 may include a stepped configuration defining a first axial segment 44 which includes flux carrying component 34 and load carrying component 32, and a second axial segment 46 which includes guide bore 42. A middle axial segment 47 may be positioned between first axial segment 44 and second axial segment 46. When assembled with actuator body 12 in fuel injector 10, first axial segment 44 may define a first radial air gap 50 between outer radial surface 38 and second body piece 18. Second axial segment 46 may define a second radial air gap 52 between outer radial surface 38 and second body piece 18. Second radial air gap 52 may be smaller than first radial air gap 50 in one embodiment, for reasons further described herein. Stator 26 may further include a first axial end surface 72 defining an axial air gap 74 with armature 28. Load carrying component 32 may include a second axial end surface 76 contacting each of first axial end surface 72 and first clamping surface 16. A majority of second axial end surface 76 may contact first clamping surface 16, with a relatively smaller part of second axial end surface 76 contacting first axial end surface 72 of stator 26, in one embodiment. In other embodiments, second axial end surface 76 may contact first clamping surface 16 but not contact first axial end surface 72 at all.

Referring in particular to FIG. 3, flux carrying component 34 may include a flux ring having an annular configuration and including a flux ring inner radial surface 78. When mounted in load carrying component 32 and positioned within actuator body 12 with other components of fuel injector 10, inner radial surface 78 adjoins sliding air gap 36. Flux carrying component 34 may further include an outer radial surface 80 and a flux ring radial thickness $t_1$ between inner radial surface 78 and outer radial surface 80. Flux carrying component 34 may further include a chamfer 79 between inner radial surface 78 and outer radial surface 80, and adjoining inner radial surface 78, which assists in channeling magnetic flux in a desired flux path into armature 28 rather than shorting to stator 26. Load carrying component 32 may include a flux ring support cup 33 configured to support flux carrying component 34, and having a support cup inner radial surface 82 contacting flux ring outer radial surface 80. Load carrying component 32 may further include a support cup outer radial surface 84 and a support cup radial thickness $t_2$ between support cup inner radial surface 82 and support cup outer radial surface 84 which is less than flux ring radial thickness $t_1$.

In one embodiment, a one-piece compound element having a flux carrying component of Somaloy® or a similar material, and a carrier component of steel, silicon iron, or the like, such as compound armature housing 30, may be made by a process of insert molding. As mentioned above, suitable materials for forming flux carrying component 34 may include a powder of relatively highly magnetic particles, each of which is encased in a non-conductive material. Engineers have found it challenging to form such materials into parts having sufficient structural integrity to withstand the relatively harsh operating environments of a solenoid actuator. As further described herein, insert molding such materials in a carrier component has been discovered to provide a practical implementation strategy for leveraging desirable magnetic properties, while overcoming the sometimes undesirable structural properties.

FIG. 3 depicts flux carrying component 34 and load carrying component 32 as separate parts for illustrative purposes. In one embodiment, flux carrying component 34 may be formed by pressing suitable powder material to a near net shape, then positioning component 34 in load carrying component 32, possibly retaining it therein via Loctite® or another suitable adhesive. Where compound armature housing 30 is formed by insert molding, however, load carrying component 32 may serve as a mold, or part of a mold, into which a powder material for flux carrying component 34 is poured. In one embodiment Somaloy® powder may be poured into flux ring support cup 33, and a suitably shaped pressing device used to apply a compressive force to the Somaloy® powder. A conventional powder metal press equipped with an appropriately shaped tool to form component 34 to an approximate desired shape may be used for this purpose. The compressive force will assist in molding together the particles of the powder such that the particles assume an annular shape approximately corresponding to that of flux carrying component 34. The pressing force used may depend at least in part on the end shape desired for the flux carrying component, the thickness of the flux carrying component in the direction of pressing force, and the intended service application. In one embodiment, the powdered material of which the flux carrying component is formed may be reduced in volume from a starting volume of the powder to an end volume of the flux carrying component by as much as 50%, although the present disclosure is not thereby limited.

In certain instances, following pressing, exposed surfaces of the flux carrying component might be ground or otherwise machined to render the compound part having desired dimensions, surface shape, and surface finish. In other instances, machining may not be required. Other solenoid actuator components for which the use of magnetic particles coated with non-conductive material is considered advantageous, such as stators and armatures, may be made by a similar insert molding process.

Once compound armature housing 30 is made, it may then be assembled with other components of fuel injector 10. In particular, compound armature housing 30 may be placed within second body component 18 with spacer 48 located between first axial segment 32 and second clamping surface 20, as shown in FIG. 2. An assembly comprised of armature 28 and movable member 29 may then be inserted into compound armature housing 30 such that movable member 29 is received in guide bore 42. Positioning armature 28 and movable member 29 within compound armature housing 30 may include positioning armature 28 at sliding radial air gap 36.

Other components of actuator assembly 24 may then be positioned within second body component 18. In particular, stator 26 may be positioned in first body component/stator housing 14, then the assembly of first body component 14 and stator 26 and possibly other components may be placed in second body component 18. Positioning the assembly of first body component 14 and stator 26 within second body component 18 may include placing stator at axial air gap 72 with armature 28, and may also be understood as establishing a magnetic flux path $P_1$. Positioning the subject assembly may also be understood as establishing a structural load path $P_2$ for actuator assembly 24. With the components positioned as described, first clamping surface 16 may contact load carrying component 32, and spacer 48 may be positioned in contact with each of first axial segment 42 and second clamping surface 20. A stop 31 may be positioned to limit travel of movable member 29. Fuel injector cap 64 may then be coupled with second body component 18 by engaging cooperating threads 68 and 70, until third clamping surface 66 contacts axial end 62 of first body component 14, and a clamping load applied.

In certain embodiments it may be desirable to magnetically isolate compound armature housing 30 from second actuator body piece 18. Placing compound armature housing 30 at radial air gap 50 and at radial air gap 52 will position compound armature housing 30 such that it does not contact second body piece 18 at all, at least in certain embodiments. Accordingly, radial air gap 50 may prevent magnetic flux from being channeled through load carrying component 32 and into second body piece 18. This avoids losing flux to actuator body 12 which would otherwise be available to impart a pull-in force on armature 28 when solenoid 90 is energized. It will be recalled that first radial air gap 50 may be larger, for example, radially thicker, than second radial air gap 52. This design feature limits the likelihood of contact occurring between second body piece 18 and first axial segment 34, since contact would be more likely to occur, if at all, between second axial segment 46 and second body piece 18. In other words, the relatively tighter clearance between second axial segment 46 and second body piece 18 than between first axial segment 44 and second body piece 18 will tend to inhibit inadvertent positioning of first axial segment 44 in contact with second body piece 18, and thus inhibit the channeling of magnetic flux through first axial segment 44 and into second body piece 18.

INDUSTRIAL APPLICABILITY

Referring to the drawings generally, operating a single-pole solenoid actuated device such as fuel injector 10 may include supporting stator 26, armature 28 and compound armature housing 30 within actuator body 12. Load carrying component 32 may support flux carrying component 34 within actuator body 12 when compound armature housing 30 is positioned for service therein. Stator 26 may further include a solenoid 90 electrically connected with a set of electrical terminals 67. When electrical current is applied to electrical terminals 67 to energize solenoid 90, solenoid 90 may generate a magnetic flux. Operating fuel injector 10 may thus further include channeling magnetic flux in actuator assembly 24 according to magnetic flux path $P_1$. Flux path $P_1$ may pass about solenoid 90, through stator 26, through flux carrying component 34, across sliding air gap 36, and into armature 28. From armature 28, the magnetic flux may be channeled across axial air gap 74 and back into stator 26. As will be understood by those skilled in the art, energizing solenoid 90 may cause armature 28 to move towards stator 26 across axial air gap 74. Movable member 29 may contact stop 31 to limit travel of armature 28 towards stator 26 and prevent contact therewith. When solenoid 90 is de-energized, armature 28 may move in a reverse direction away from stator 26, under the influence of a return spring 19 coupled with movable member 29.

Moving armature 28 by energizing solenoid 90 may further cause movable member 29 to move from a first pin position to a second pin position. This in turn may result in movement of valve member 86 from a first valve position to a second valve position by way of a fluid pressure of fuel supplied via fuel inlet 56. Moving valve member 86 may occur during moving movable member 29, and can result in relieving a closing hydraulic pressure on outlet check 88 to enable moving outlet check 88 from a closed position to an open position to initiate fuel injection. De-energizing solenoid 90 will tend to result in closing of outlet check 88.

Operating device 10 may further include channeling a clamping load between first body piece 14 and second body piece 18 through load carrying component 32 of compound armature housing 30. As discussed above, clamping mechanism 22 may include cooperating threads 68 and 70 which enable fuel injector cap 64 to be urged downward against first body piece 14, and thereby clamp compound armature housing 30 and spacer 48 between first clamping surface 16 and second clamping surface 20. In FIG. 2, load path $P_2$ is shown which includes a first load path segment through first body piece 14, a second load path segment through load carrying component 32, a third load path segment through spacer 48 and a fourth load path segment through second body piece 18.

Figure 4:
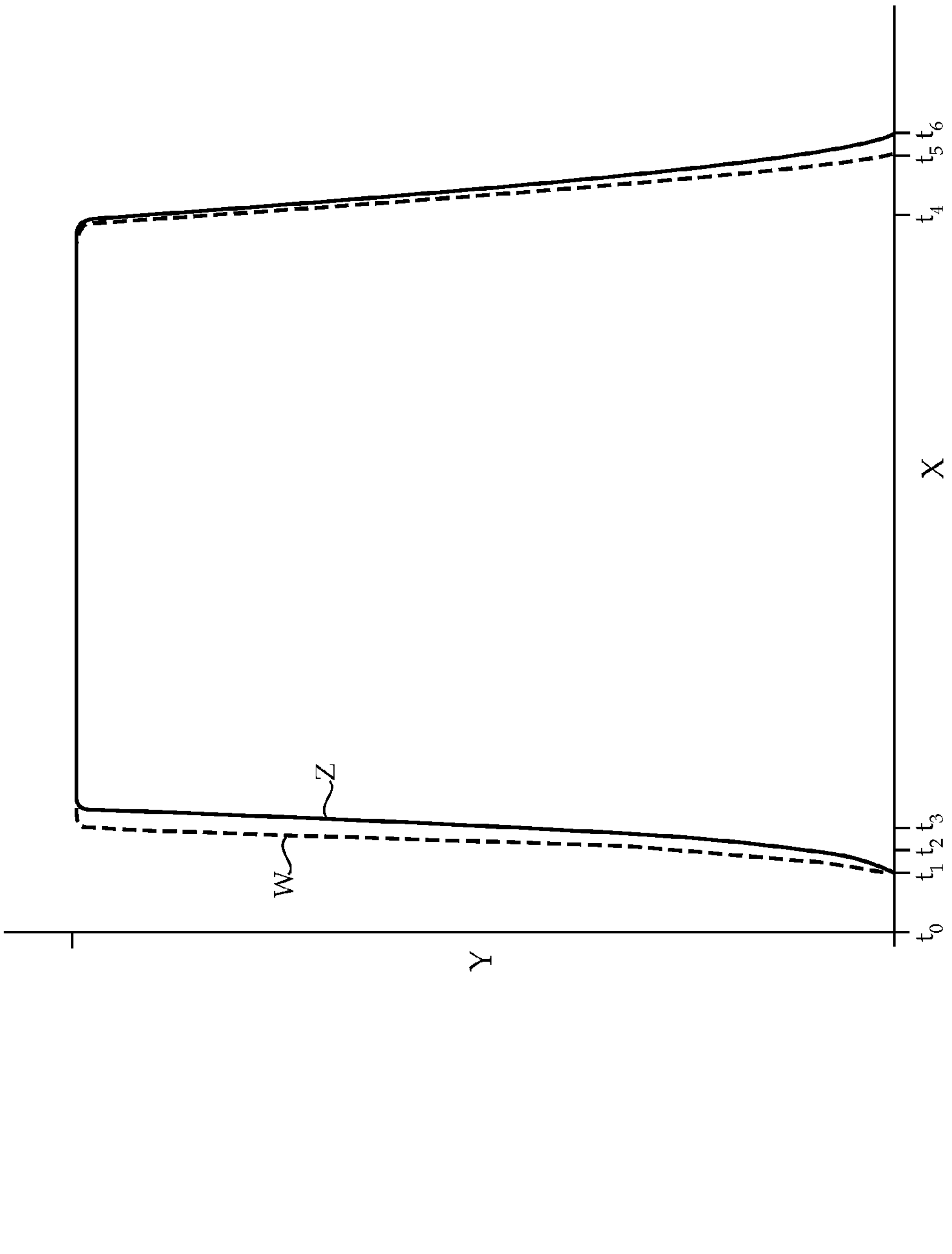
FIG. 4 is a graph illustrating armature position over time for two different single-pole solenoid actuator assemblies.

Turning now to FIG. 4, there is shown a graph wherein the Y-axis represents position and the X-axis represents time. The graph of FIG. 4 includes a solid line Z illustrating example operation of a conventional single-pole solenoid actuator assembly or device using a solid piece of relatively uniform material as a flux carrying component or flux ring, and a dashed line W illustrating example operation of a single-pole solenoid actuator assembly or device according to the present disclosure.

In FIG. 4, a time $t_1$ represents initial solenoid energization for each example device. A time $t_2$ represents an end of armature motion time at which an armature such as armature 28 in a solenoid actuator assembly according to the present disclosure reaches its position of maximum displacement, where movable member 29 contacts stop 31, for example. A time $t_3$ represents an end of motion time for the conventional device. It may be noted that a relatively faster response time is associated with energizing a solenoid actuator according to the present disclosure. Another time $t_4$ represents a start of armature motion time when a solenoid for each example device is de-energized and the associated armature begins to return toward its rest position. It may be noted that a relatively faster response time is associated with de-energizing a solenoid actuator according to the present disclosure. The device according to the present disclosure ceases motion following solenoid de-energization at a time $t_5$, whereas the conventional device ceases motion at a later time $t_6$.

The improved, faster response of a device according to the present disclosure is believed due at least in part to reduced eddy currents. Since the electrical conductivity of flux carrying component 34 is less than that of conventional flux ring materials the generation of eddy currents which produce problematic magnetic fields is reduced. As a result, when magnetic flux is generated by energizing solenoid 90, or when flux decays by de-energizing solenoid 90, armature 28 is less affected, if at all, by eddy current-generated magnetic fields or residual magnetism, in comparison with earlier designs having uniform, solid flux rings and even slotted flux rings. In the particular case of actuators used for certain applications such as valve control in a fuel injector, relatively more precise and predictable operation will be possible than in earlier systems.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A solenoid actuated device comprising:

an actuator body including a first body piece having a first clamping surface, a second body piece having a second clamping surface, and a clamping mechanism which includes a release state and a clamping state;

a single-pole solenoid actuator assembly positioned at least partially within the actuator body and including a stator, an armature movable relative to the stator, and a movable pin coupled with the armature;

the single-pole solenoid actuator assembly further including a one-piece compound armature housing defining a longitudinal axis and including an outer radial surface and an inner radial surface defining a guide bore for the movable pin, the compound armature housing having a load carrying component clamped between the first clamping surface and the second clamping surface, and a flux carrying component supported by the load carrying component and defining a sliding air gap with the armature, the load carrying component having a high structural strength and a low flux permeability, and the flux carrying component having a low structural strength and a high flux permeability, wherein the compound armature housing has a stepped configuration defining a first axial segment which includes the flux carrying component and the load carrying component, and a second axial segment which includes the guide bore; and a spacer positioned axially between the first axial segment of the compound armature housing and the second body piece, wherein the first clamping surface contacts the first axial segment of the compound armature housing and the second clamping surface contacts the spacer.

2. The solenoid actuated device of claim 1 wherein the first axial segment defines a first radial air gap between the outer radial surface and the second body piece and the second axial segment defines a second radial air gap between the outer radial surface and the second body piece which is smaller than the first radial air gap.

3. The solenoid actuated device of claim 2 wherein the movable pin includes a valve control pin movable between a first pin position and a second pin position, and the solenoid actuated device further includes a control valve mechanism positioned at least partially within the second body piece and being controllably coupled with the valve control pin.

4. The solenoid actuated device of claim 1 comprising a fuel injector, wherein the first body piece includes a stator housing, wherein the second body piece includes a fuel injector valve body defining a fuel inlet, and wherein the actuator body further includes a fuel injector nozzle body defining at least one nozzle outlet in fluid communication with the fuel inlet.

5. The solenoid actuated device of claim 4 wherein:

the stator housing includes a first stator housing end which includes the first clamping surface, and a second stator housing end;

the actuator body further includes a fuel injector cap having a third clamping surface contacting the second stator housing end, the stator housing being clamped between the fuel injector cap and the compound armature housing; and the clamping mechanism includes a first set of threads located on the fuel injector cap and a second set of threads located on the second body piece.

6. The solenoid actuated device of claim 5 wherein the stator includes a first axial end surface defining an axial air gap with the armature, and wherein the load carrying component includes a second axial end surface contacting each of the first axial end surface and the first clamping surface.

7. The solenoid actuated device of claim 5 wherein:

the flux carrying component includes a flux ring having a flux ring inner radial surface adjoining the sliding air gap, a flux ring outer radial surface, and a flux ring radial thickness between the flux ring inner radial surface and the flux ring outer radial surface; and the load carrying component includes a flux ring support cup having a support cup inner radial surface contacting the flux ring outer radial surface, a support cup outer radial surface and a support cup radial thickness between the support cup inner radial surface and the support cup outer radial surface which is less than the flux ring radial thickness.

8. A method of making a solenoid actuated device comprising the steps of:

establishing a magnetic flux path for a single-pole solenoid actuator at least in part via the steps of placing an armature at an axial air gap with a stator, and placing the armature at a sliding radial air gap with a flux carrying component of a one-piece compound armature housing;

establishing a structural load path for the single-pole solenoid actuator at least in part via a step of placing a load carrying component of the one-piece compound armature housing between a first actuator body piece and a second actuator body piece;

clamping the one-piece compound armature housing between the first actuator body piece and the second actuator body piece; and magnetically isolating the compound armature housing from the second actuator body piece at least in part via the steps of placing the compound armature housing at a radial air gap with the second actuator body piece, placing a first axial segment of the compound armature housing at a first radial air gap with the second actuator body piece, the first axial segment including the flux carrying component and the load carrying component, and placing a second axial segment of the compound armature housing at a second radial air gap with the second actuator body piece which is smaller than the first radial air gap, the second axial segment defining a guide bore for a movable member coupled with the armature.

9. The method of claim 8 further comprising a step of placing a spacer axially between the first axial segment and the second actuator body piece, wherein the step of establishing a structural load path further includes establishing a structural load path that includes the spacer.

10. The method of claim 8 further comprising the steps of forming the flux carrying component in an annular shape, and securing the flux carrying component within an axial segment of the compound armature housing which includes the load carrying component.

11. A method of operating a single-pole solenoid actuated device comprising the steps of:

supporting a stator, an armature and a one-piece compound armature housing, of a single-pole solenoid actuated device, within an actuator body, the actuator body including a first body piece having a first clamping surface, a second body piece having a second clamping surface, and a clamping mechanism, the compound armature housing including a stepped configuration defining a first axial segment which includes a load carrying component;

supporting a flux carrying component within the one-piece compound armature housing with the load carrying component of the one-piece compound armature housing via a step of positioning a spacer axially between the first axial segment of the compound armature housing and the second body piece;

channeling magnetic flux across a sliding air gap between the flux carrying component and the armature; and channeling a clamping load between the first actuator body piece and the second actuator body piece through the load carrying component of the one-piece compound armature housing via a step of clamping the load carrying component between the first clamping surface and the second clamping surface, wherein the first clamping surface contacts the first axial segment of the compound armature housing and the second clamping surface contacts the spacer.

12. The method of claim 11 wherein the first actuator body piece includes a stator housing, and wherein the step of channeling a clamping load further includes channeling a clamping load which includes a first load path segment through the stator housing, a second load path segment through the load carrying component and a third load path segment through a spacer positioned between the load carrying component and the second body component.

13. The method of claim 12 further comprising the steps of:

energizing a solenoid of the single-pole solenoid actuated device; and moving a valve control pin coupled with the armature from a first pin position to a second pin position in response to energizing the solenoid; and moving a valve member coupled with the valve control pin from a first valve position to a second valve position by way of a fluid pressure, during the step of moving the control pin.

14. The method of claim 13 wherein the single-pole solenoid actuated device includes a fuel injector, and wherein the step of moving a valve member further includes moving a check control valve member of the fuel injector, the method further comprising a step of moving an outlet check of the fuel injector from a closed position to an open position in response to moving the check control valve member.

* * * * *